June 23, 1931. A. BROMBERG 1,811,743
CUTTER FOR VEGETABLES AND FRUITS
Filed July 20, 1928  2 Sheets-Sheet 1
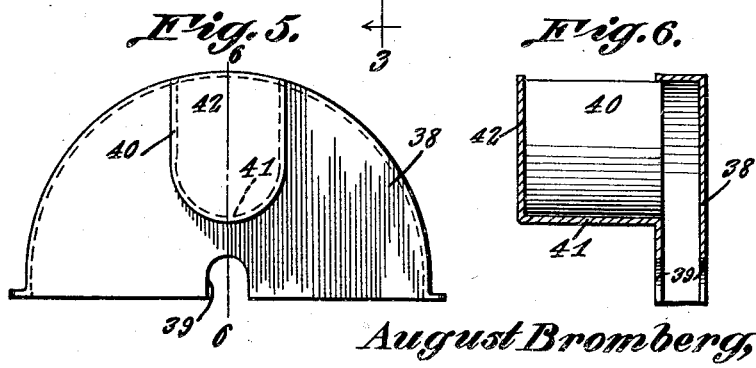
August Bromberg, Inventor
By Victor J. Evans
Attorney June 23, 1931.  A. BROMBERG  1,811,743
CUTTER FOR VEGETABLES AND FRUITS
Filed July 20, 1928  2 Sheets-Sheet 2
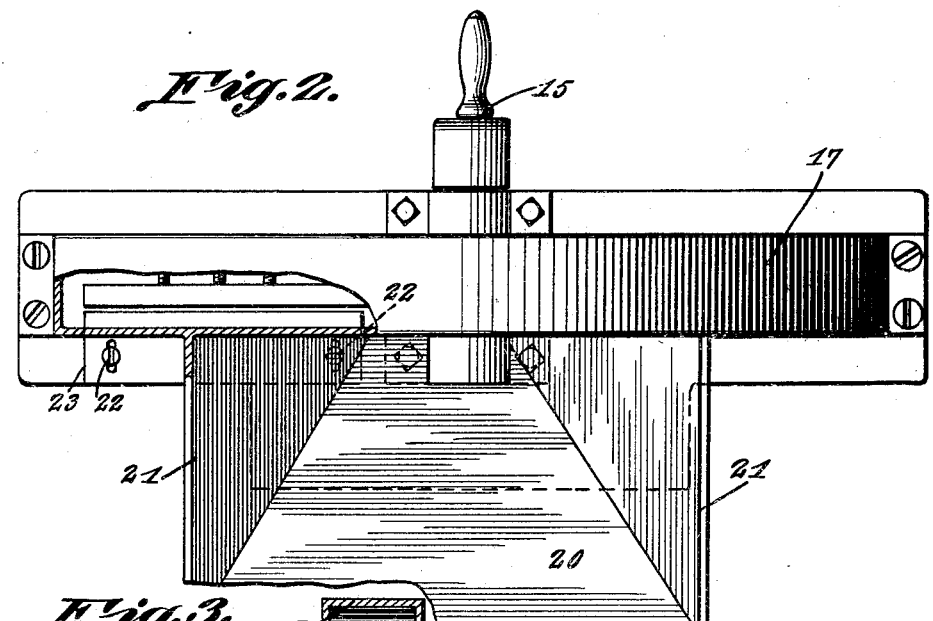
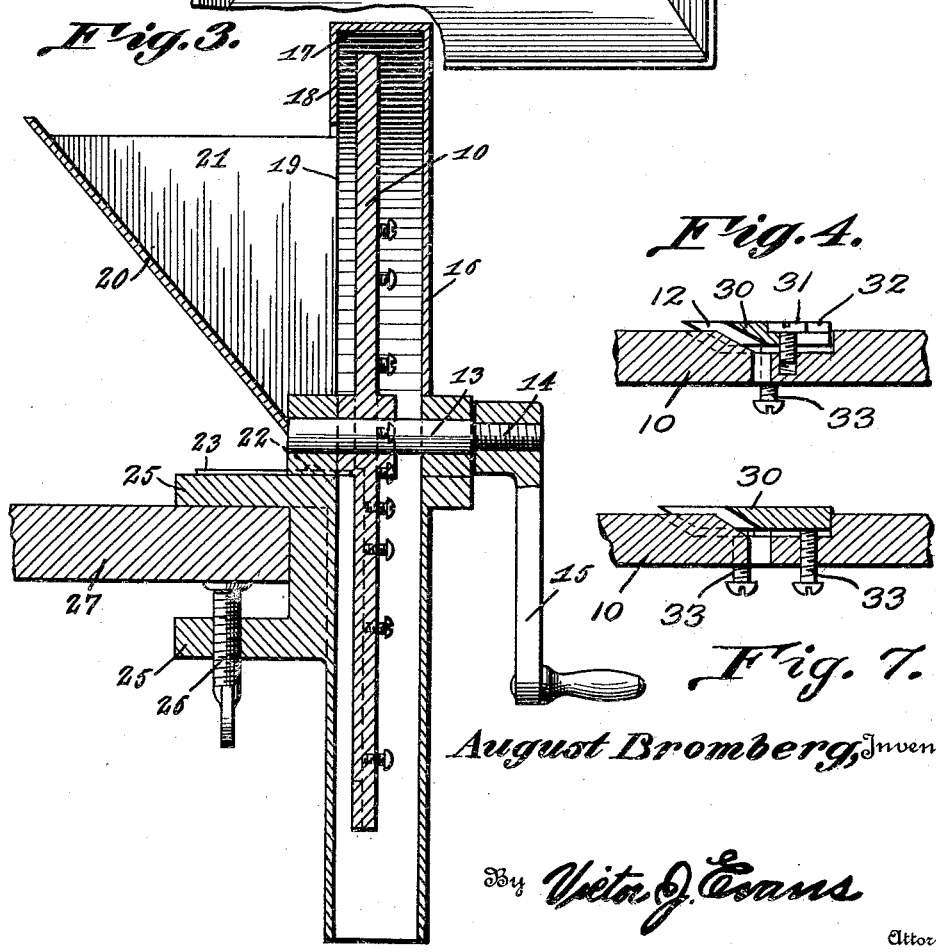
August Bromberg, Inventor
By Victor J. Evans
Attorney Patented June 23, 1931

1,811,743

UNITED STATES PATENT OFFICE

AUGUST BROMBERG, OF WAUWATOSA, WISCONSIN, ASSIGNOR OF ONE-HALF TO ENOS L. DILLON, OF MILWAUKEE, WISCONSIN

CUTTER FOR VEGETABLES AND FRUITS

Application filed July 20, 1928. Serial No. 294,160.

The object of this invention is to provide special means for cutting vegetables and fruits with much greater facility than can be accomplished by hand, the device including a rotary element with individual cutters mounted as described below.

A further object is to provide, in connection with the housing of the rotary element, means for receiving those vegetables and fruits which require handling or manipulation in a particular manner.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:—

Figure 1 is a view of the device in elevation and section, with parts in dotted lines.

Figure 2 is a top plan view with a portion of the housing broken away.

Figure 3 is a vertical section on line 3—3 of Figure 1.

Figure 4 is a detail in section, on line 4—4 of Figure 1, showing the adjustable mounting of one of the cutting blades.

Figure 5 is a detail in elevation showing a modified form of housing member for receiving small fruits or vegetables to be sliced.

Figure 6 is a section on line 6—6 of Figure 5.

Fig. 7 is a detail in section similar to Fig. 4, taken on a line parallel to line 4—4 in Fig. 1 but farther to the left.

In carrying out the invention, I provide a rotary element 10 which may be of disk form, this element having channels 11 each of which may have a beveled wall such as 12, with which the sharp edges of the cutters cooperate.

The disk or other rotary element 10 is mounted by means of a shaft 13, threaded at 14 for securing a crank 15 by means of which movement is imparted to said disk 10.

A housing for the rotary cutter or slicing device includes a wall 16 and an edge portion 17, and a wall 18 toward the outer portion of the housing, this side of the casing or housing being provided with an opening at 19 communicating with the interior of the hopper or other similar element. This hopper or vegetable receiving device may be formed if desired with the walls of the housing, or may be applied thereto. The hopper includes an outer inclined wall 20 and end walls such as 21. The casing member on this side of the device may be secured by means of screws or the like 22 passing thru flange portion 23 and into supporting and clamping member 25 of suitable form as indicated in Figure 3, where a U-shaped or channel structure is shown.

A clamping screw or thumb screw 26 provides means for securing the housing to a stationary element 27 which may be assumed to represent the edge portion of the table or the like.

An important feature of the construction is that shown in Figure 4 wherein the mounting of the cutting devices is illustrated in detail.

The blades 30 are curved as shown in Figure 1, and these blades are secured by screws 31 passing thru slots 32, permitting of adjustment toward and away from the wall 12, so that the beveled edges of the blades 30 may be accurately positioned. The slots 32 have an open end as shown in Figure 1, and a considerable degree of adjustment is practicable in connection with the mounting devices per se represented by 31.

Further adjustment of the blades 30 is obtained by screws 33 which are inserted thru disk 10 from a direction opposite to that in which screws 31 were inserted. This arrangement provides for the slight tilting or variation in inclination of the edges of the blades with reference to the surface of the disk 10 at the edge portions of the channels 11.

By referring to Figures 1, 4 and 7 of the official drawings it will be noted that one of the screws 33 for each blade is arranged laterally of the other screws of the respective blade that the third point of contact or support is provided for the blade.

In view of the adaptability of the device because of the particular adjustment of the cutters, and because of the provision indicated below for special vegetable or fruit holding means,—the machine is suitable for a variety of uses, and is capable of handling and slicing material with speed and satisfaction so far as results are concerned.

In Figures 5 and 6 I have illustrated a casing or housing member designated 38, this member including a cut away portion 39 for cooperation with the axial element by means of which the rotary device is mounted.

The vegetable or fruit holding device comprises a U-shaped structure 40, the bend of the U designated 41 being toward the axis of rotation, and the walls shown in Figure 5 as extending vertically, being substantially parallel if desired. The end wall is designated 42. This arrangement permits of the convenient mounting of small articles to be sliced which cannot readily be taken care of in a satisfactory manner in a relatively large hopper such as that shown in Figure 3. Moreover it is frequently desired to effect the slicing by making a cut in a direction parallel to a preceding cut without changing the position of the article being sliced, which change or movement readily occurs when the hopper is larger than necessary.

What I claim is:—

A cutter including a casing having a hopper and a discharge neck, a cutter disk journaled in said casing and having knife grooves each including a straight side wall and an oppositely inclined side wall, adjusting screws threaded into the disk at the grooves, cutting blades positioned in the grooves with the cutting edges disposed adjacent the inclined side walls and having slots opening outwardly through the non-cutting edges thereof to receive the screws to permit the blades to be adjusted to vary the cutting edges towards and from the inclined walls and set screws carried by the disks at the opposite side of the disks from the adjusting screws and bearing against the blades and cooperating with the adjusting screws in varying the inclination of the cutting edges of the blades relative to the inclined side walls of the grooves.

In testimony whereof I affix my signature.

AUGUST BROMBERG.